United States Patent
Nico et al.

(10) Patent No.: US 12,095,333 B2
(45) Date of Patent: Sep. 17, 2024

(54) VIBRATIONAL ENERGY HARVESTER

(71) Applicant: University of Limerick, Limerick (IE)

(72) Inventors: Valeria Nico, Clancy's Strand (IE); Jeff Punch, Limerick (IE)

(73) Assignee: UNIVERSITY OF LIMERICK, Limerick (IE)

( * ) Notice: Subject to any disclaimer, the term of this patent is extended or adjusted under 35 U.S.C. 154(b) by 339 days.

(21) Appl. No.: 17/622,745

(22) PCT Filed: Jun. 29, 2020

(86) PCT No.: PCT/EP2020/068269
§ 371 (c)(1),
(2) Date: Dec. 24, 2021

(87) PCT Pub. No.: WO2020/260698
PCT Pub. Date: Dec. 30, 2020

(65) Prior Publication Data
US 2022/0166300 A1    May 26, 2022

(30) Foreign Application Priority Data
Jun. 27, 2019 (GB) ...................................... 1909277

(51) Int. Cl.
*H02K 35/02* (2006.01)
(52) U.S. Cl.
CPC .................................... *H02K 35/02* (2013.01)
(58) Field of Classification Search
CPC .............................. H02K 35/02; H02K 7/1876
See application file for complete search history.

(56) References Cited

U.S. PATENT DOCUMENTS

| | | | | |
|---|---|---|---|---|
| 8,030,786 B2 | 10/2011 | Jackson et al. | | |
| 2008/0217926 A1* | 9/2008 | Lemieux | ................ | H02K 35/02 290/1 R |
| 2011/0074162 A1* | 3/2011 | Cottone | ................ | H02N 2/186 290/1 R |

FOREIGN PATENT DOCUMENTS

| | | | | |
|---|---|---|---|---|
| EP | 2882092 A1 * | 6/2015 | ............. | H02K 35/02 |
| KR | 20160118069 A * | 6/2015 | ............. | H02K 35/02 |
| WO | 2017/021842 A1 | 2/2017 | | |
| WO | 2020/260698 A1 | 12/2020 | | |

OTHER PUBLICATIONS

Machine translation of KR 20160118069 A (Year: 2016).*

(Continued)

*Primary Examiner* — Bernard Rojas
(74) *Attorney, Agent, or Firm* — Brian J. Colandreo; Jeffrey T. Placker; Holland & Knight LLP

(57) ABSTRACT

A vibrational energy harvester (100, 200, 300, 400) comprises a first mass (101, 201, 301) comprising a first internal cavity (102, 202, 302) and a second mass (103, 203) disposed within and configured to move within the first internal cavity. Movement of the second mass relative to the first mass induces an electrical current in one of the first mass and the second mass. The vibrational energy harvester also comprises a housing (104, 204, 404) comprising a second internal cavity (105, 405). The first mass is disposed within and configured to move within the second internal cavity. An adjustment mechanism (419) is also provided, configured to adjust a size of the second internal cavity.

18 Claims, 10 Drawing Sheets

(56) References Cited

OTHER PUBLICATIONS

Machine translation of KR 20160118069 A (Year: 2016) (Year: 2016).*
International Search Report and Written Opinion issued in related Application Serial No. PCT/EP2020/068269 on Issue Date; Oct. 5, 2020.

* cited by examiner

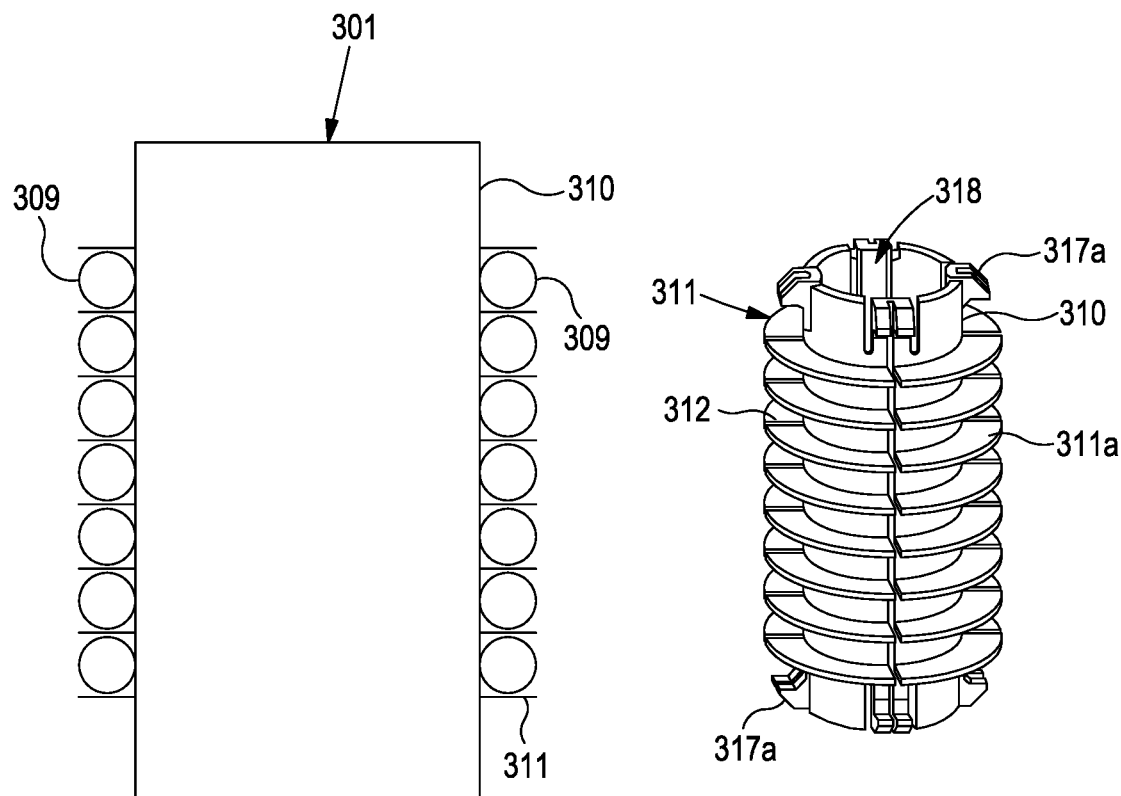
Figure 3A
Figure 3B
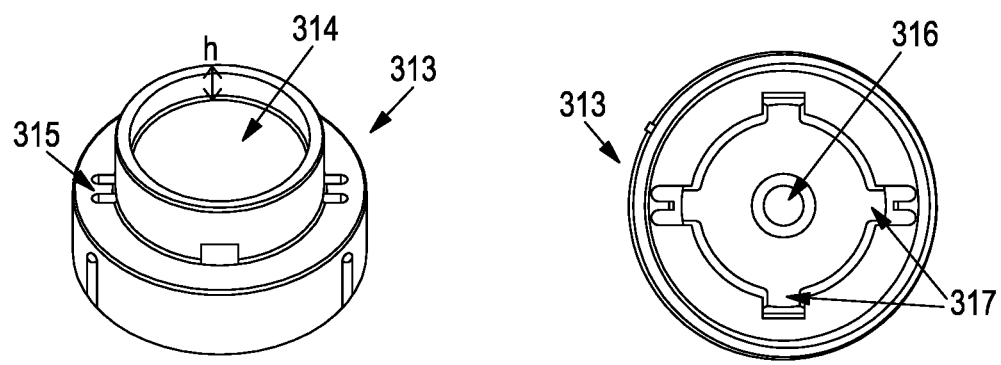
Figure 3C
Figure 3D

VIBRATIONAL ENERGY HARVESTER

CROSS-REFERENCE TO RELATED APPLICATIONS

This application is a U.S. National Stage of International Patent Application No. PCT/EP2020/068269, filed 29 Jun. 2020, which claims priority to Great Britain Patent Application No: 1909277.4, filed on 27 Jun. 2019. The disclosures of which are incorporated herein by reference in their entirety.

FIELD OF THE INVENTION

The invention relates generally to a vibrational energy harvester. In particular, the invention relates to a dual-mass vibrational energy harvester.

BACKGROUND

Vibrational energy harvesters are typically based on linear oscillators which have a narrow frequency bandwidth (i.e., a resonant frequency) that is a characteristic given by the vibrational energy harvester's mass, spring constants and dimensions. Such vibrational energy harvesters can therefore only harvest energy efficiently if the resonant frequency of the vibrational energy harvester is close to the main frequency of ambient vibrations from which energy is to be harvested.

Different methods have been suggested to overcome the problem of narrow bandwidth vibrational energy harvesters, for example using coupled harmonic oscillators. However, increasing the output power and broadening the bandwidth of vibrational energy harvesters simultaneously and maintaining a frequency response below 100 Hz for small-scale harvesters are among the main challenges. In general, and particularly for linear resonators, resonant frequency increases as scale decreases, which makes it difficult to realise small-scale energy harvesters in practice (most sources feature frequencies below 100 Hz).

Aspects and embodiments of the present invention have been devised with the foregoing in mind.

SUMMARY

According to an aspect, there is provided a vibrational energy harvester. The vibrational energy harvester may comprise a first mass. The first mass may comprise a first internal cavity. The vibrational energy harvester may comprise a second mass. The second mass may be disposed within the first internal cavity. The second mass may be configured to move within the first internal cavity. Movement of the second mass relative to the first mass may induce an electrical current in one of the first mass and the second mass. The vibrational energy harvester may comprise a housing. The housing may comprise a second internal cavity. The first mass may be disposed within the second internal cavity. The first mass may be configured to move within the second internal cavity. The vibrational energy harvester may further comprise an adjustment mechanism. The adjustment mechanism may be configured to adjust a size of the second internal cavity.

Common vibrational energy harvesters have a resonant frequency that is a characteristic of the device itself (given by the harvester's mass, spring constants and dimensions). Each device can therefore work only in specific applications targeted at harvesting particular specific vibration frequencies, since its resonant frequency cannot be changed or altered. By implementing an adjustment mechanism allowing for a size of the second internal cavity to be adjusted, a resonant frequency of the vibrational energy harvester can be adjusted. A single vibrational energy harvester may therefore be utilised in or tailored for a number of different applications each harvesting vibrations of a different frequency. Use of the vibrational energy harvester in multiple applications may be further enhanced if a resonant frequency of the vibrational energy harvester may be adjusted without adjusting an external size of the vibrational energy harvester.

Movement of the second mass within the first internal cavity defined by the first mass may allow impacts between the first mass and the second mass. Impacts between the first mass and the second mass may enable momentum transfer between the two masses, and may provide velocity amplification of the first mass and/or the second mass (which may increase a relative velocity between the two masses and therefore increase a magnitude of induced electrical current). Impacts between the two masses may also introduce non-linear mechanical effects, which may enable a frequency response or bandwidth of the vibrational energy harvester to be improved. Similar considerations may apply to impacts of the first mass with the housing of the vibrational energy harvester. Disposing the second mass inside the first mass may also reduce a volume of the vibrational energy harvester whilst providing advantages associated with a dual-mass vibrational energy harvester.

The adjustment mechanism may be configured to adjust the size of the second internal cavity without adjusting an external size of the vibrational energy harvester.

The housing may comprise a plurality of portions. At least one of the portions of the housing may be movable relative to one or more of the other portions of the housing. The adjustment mechanism may be or comprise at least one of the movable portions of the housing.

The vibrational energy harvester may further comprise a cam. The cam may be located within the housing. The cam may be coupled to the at least one movable portion of the housing. The second internal cavity may be defined between the cam and an internal surface of the housing. The internal surface of the housing may be or comprise an end surface of the housing.

An axial position of the cam relative to the one or more other portions of the housing may be adjustable in response to movement of the at least one movable portion of the housing relative to the one or more other portions of the housing. An axial position of the cam within the housing may be adjustable in response to movement of the at least one movable portion of the housing relative to the one or more other portions of the housing. Movement of the at least one movable portion of the housing may be rotational movement or axial movement (for example, in a longitudinal direction of the vibrational energy harvester) relative to the one or more other portions of the housing. A cam configured to move axially within the housing as a result of linear or axial force may be referred to as a slider cam or a slider. For example, a cam for which an axial position of the cam relative to the one or more other portions of the housing is adjustable in response to axial movement of the at least one moveable portion of the housing relative to the one or more other portions of the housing may be referred to as a slider cam or a slider.

The cam and the at least one movable portion of the housing may be coupled to one another. The coupling may allow or enable relative movement between the cam and the at least one movable portion of the housing. The cam and the at least one movable portion of the housing may be coupled via corresponding male and female connectors (for example, one or more female recesses or grooves configured to engage with corresponding male protrusions, flanges or tongues). Movement of the male connector within the female connector may enable relative movement between the cam and the at least one movable portion of the housing. The cam may comprise either of the male or female connectors, and the at least one movable portion may comprise the other of the male or female connectors. The female recess or groove may be one of a helical groove and a linear groove.

Alternatively, the coupling may not allow or enable relative movement between the cam and the at least one movable portion of the housing. The cam and the at least one movable portion of the housing may be coupled together and configured to move together (for example, as a single entity). The cam and the at least one movable portion of the housing may be coupled together and configured to move together relative to the one or more other portions of the housing. The coupled cam and the at least one movable portion of the housing may additionally be coupled to the one or more other portions of the housing, for example via one or more channels in the one or more other portions of the housing and one or more connecting elements (for example, one or more rods or beams). Each of the one or more connecting elements may engage with (for example, extend through) at least one of the one or more channels. The cam may be coupled to the at least one movable portion by the one or more connecting elements.

The second mass may be configured to move along a first fixed axis within the first internal cavity. The first mass may be configured to move along a second fixed axis within the second internal cavity. The first fixed axis and the second fixed axis may be coaxial or may be or comprise the same axis. Efficiency of energy harvesting may be improved by ensuring movement of each of the first mass and the second mass is directed along a respective fixed axis, and further improved or maximised by directing movement of each of the first mass and the second mass to be along the same axis or coaxial axes.

The vibrational energy harvester may further comprise one or more elements disposed at each end of the first internal cavity. The elements are configured to control oscillation of the second mass in the first internal cavity. The one or more elements may be or comprise one of magnetic springs and mechanical springs. The vibrational energy harvester may further comprise one or more elements disposed at each end of the second internal cavity. The elements may be configured to control oscillation of the first mass in the second internal cavity. The one or more elements may be or comprise one of magnetic springs and mechanical springs.

Elements for controlling oscillation of the first mass and/or the second mass may improve or maximise efficiency of energy harvesting by enabling kinetic energy of the first mass and the second mass to be recovered. For example, kinetic energy of the first mass may be transformed into and stored as potential energy on impact with the one or more elements configured to control oscillation, rather than dissipated as heat energy on impact with a surface of the housing. Stored potential energy may then in turn be transformed into kinetic energy of the first mass as the one or more elements propel the first mass in a different direction (for example, an opposite direction to its direction of travel before impact with the one or more elements for controlling oscillation). The same principle may be applied with respect to the elements controlling oscillation of the second mass. In this way, relative movement between the first mass and the second mass to induce an electrical current in one of the first mass and the second mass may be improved or maximised, in turn increasing or maximising efficiency of energy harvesting.

Magnetic springs may reduce or limit mechanical losses typically associated with mechanical springs. Magnetic springs may also reduce a resonant frequency of the vibrational energy harvester, as magnetic springs usually require or take up less physical space than mechanical springs. Magnetic springs may also introduce non-linear contributions to dynamics of the vibrational energy harvester, which may increase or improve a bandwidth or frequency response of the vibrational energy harvester. Mechanical springs may reduce the number of magnetic components which could interfere with magnetic material of the first mass or the second mass (which can potentially reduce a power output of the vibrational energy harvester).

The first mass may have a greater mass than the second mass. The second mass may have a greater mass than the first mass. The first mass may have substantially the same mass as the second mass. A mass ratio of the first mass to the second mass may be between substantially 1:1 and substantially 10:1, for example between substantially 1:1 and substantially 5:1, or between substantially 6:1 and substantially 10:1.

The first mass may comprise an electrically conductive material and the second mass may comprise a magnetic material. Alternatively, the second mass may comprise an electrically conductive material and the first mass may comprise a magnetic material. A mass of the first mass and/or the second mass, or a mass ratio of the first mass to the second mass may be altered or controlled to adjust a resonant frequency of the vibrational energy harvester. Different masses or mass ratios may be used to more efficiently harvest vibrational energy at different vibrational frequencies.

The first mass may be or comprise a plurality of electrically conductive coils. The plurality of coils may be wound using a single wire or using multiple wires. The coils may be wound such that adjacent coils alternate between being wound clockwise and being wound anti-clockwise. Alternatively, adjacent coils may be connected in series and anti-series. In this way, current cancellation may be minimised.

The second mass may be or comprise a stack of magnets. The stack of magnets may be arranged to maximise a magnetic field intensity along a length of the second mass. The stack of magnets may comprise one or more of a Halbach stack, a stack of oppositely axially polarised magnets and a stack of axially polarised magnets.

The vibrational energy harvester may comprise an electrical output portion. The electrical output portion may be electrically connected to the one of the first mass or the second mass in which an electrical is induced. The electrical output portion may be connected to the one of the first mass or the second mass in which an electrical current is induced via one or more conductive springs. Conductive springs may increase the operational lifetime of electrical contacts between the electrical output portion and the conductive material (compared to, for example, soldered electrical contacts). An elastic constant of the one or more conductive springs may be lower than an elastic constant of elements controlling oscillation of the first mass or the second mass in the second internal cavity or the first internal cavity respectively. Conductive springs having a lower elastic constant than elements controlling oscillation of the first mass or the second mass may provide a robust electrical connection without affecting the dynamic oscillatory behaviour of the first mass or the second mass.

A size of the second internal cavity may be adjustable in increments of between substantially 0.25 mm and 1.0 mm (for example in increments of substantially 0.5 mm). A size of the second internal cavity may be adjustable between a length of substantially 80 mm and a length of substantially 40 mm, or between a length of substantially 70 mm and a length of substantially 50 mm, or between a length of substantially 64 mm and a length of substantially 53 mm. Fine adjustment of the size of the second internal cavity may enable fine control of a resonant frequency of the vibrational energy harvester, allowing the vibrational energy harvester to maximise efficiency or energy harvesting across a number of applications at different resonant frequencies.

A resonant frequency of the vibrational energy harvester may be adjustable by substantially 40 Hz, or by substantially 30 Hz, or by substantially 20 Hz. A resonant frequency of the vibrational energy harvester may be adjustable by adjusting a size of the second internal cavity.

A resonant frequency of the vibrational energy harvester may be adjustable between substantially 5 Hz and substantially 45 Hz, or between substantially 10 Hz and substantially 40 Hz, or substantially 15 Hz and substantially 35 Hz. A resonant frequency of the vibrational energy harvester may be adjustable by adjusting a size of the second internal cavity.

Features which are described in the context of separate aspects and embodiments of the invention may be used together and/or be interchangeable, and these embodiments are specifically envisaged. Similarly, where features are, for brevity, described in the context of a single embodiment, these may also be provided separately or in any suitable sub-combination.

BRIEF DESCRIPTION OF DRAWINGS

In order that the invention can be well understood, embodiments will now be discussed by way of example only with reference to the accompanying drawings, in which:

FIGS. 3A to 3E show various views and components of a first mass of an embodiment of a vibrational energy harvester in accordance with the invention;

Figure 1:
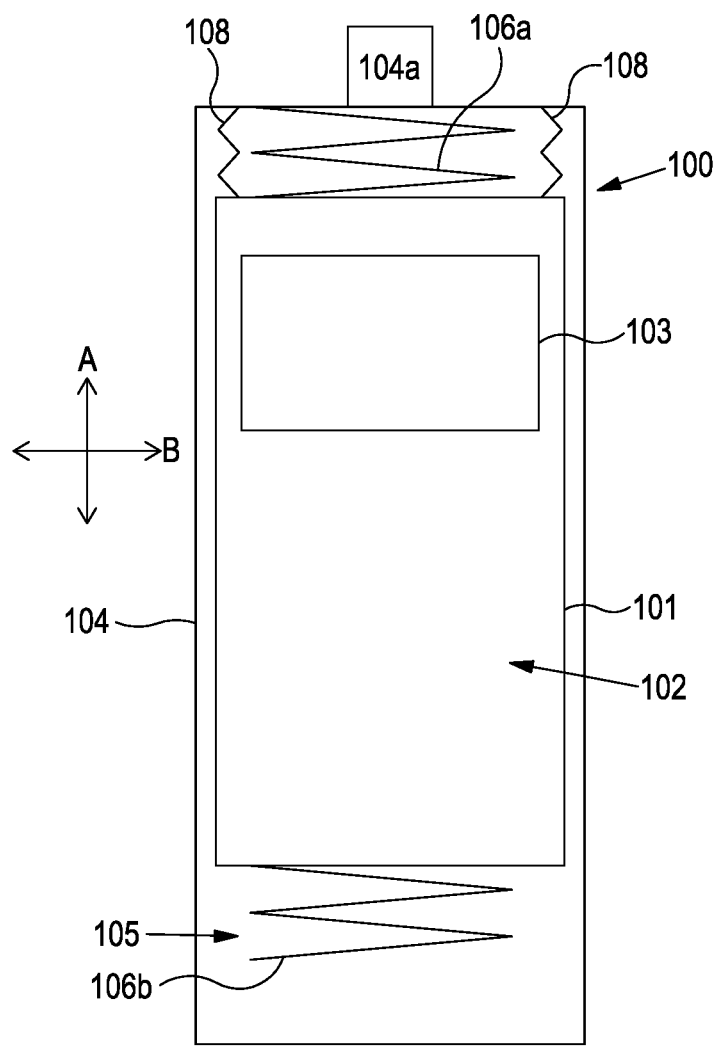
FIG. 1 shows an embodiment of a vibrational energy harvester in accordance with the invention.

It should be noted that the figures are diagrammatic and may not be drawn to scale. Relative dimensions and proportions of parts of these figures may have been shown exaggerated or reduced in size, for the sake of clarity and convenience in the drawings.

The same or like reference signs are generally used to refer to corresponding or similar features in modified and/or different embodiments. Features which are described in the context of separate aspects and embodiments of the invention may be used together and/or be interchangeable wherever possible. Similarly, where features are, for brevity, described in the context of a single embodiment, these may also be provided separately or in any suitable sub-combination.

DETAILED DESCRIPTION

FIG. 1 shows an embodiment of a vibrational energy harvester 100 according to the invention. The vibrational energy harvester 100 comprises a first mass 101. The first mass 101 comprises or defines a first closed internal cavity 102. The first mass 101 also comprises or is manufactured from an electrically conductive material (e.g., copper). The vibrational energy harvester 100 also comprises a second mass 103. The second mass 103 comprises or is manufactured from a magnetic material (e.g., the second mass 103 may be a magnet). The magnetic material may be or comprise at least one of Neodymium Iron Boron (NdFeB), AlNiCo magnetic alloy, Samarium Cobalt, Strontium Ferrite and Barium Ferrite. The second mass 103 is disposed within the first closed internal cavity 102. The second mass 103 does not fill the first closed internal cavity 102, and is configured to move within the first closed internal cavity 102.

Movement of the magnetic material of the second mass 103 (in the first closed internal cavity 102) relative to the electrically conductive material of first mass 101 induces an electrical current in the conductive material of the first mass 101. Alternatively, the first mass 101 may comprise or be manufactured from a magnetic material, and the second mass 103 may comprise or be manufactured from an electrically conductive material. The first mass 101 may have a greater mass than the second mass 103, or vice versa. Alternatively, the first mass 101 and the second mass 103 may have the same mass. In some embodiments, the mass ratio of the first mass to the second mass is substantially 5:1. Alternatively, the mass ratio of the first mass to the second mass may be greater than substantially 5:1, for example, between substantially 6:1 and substantially 10:1.

The vibrational energy harvester 100 also comprises a housing 104. The housing 104 comprises a second internal cavity 105. The first mass 101 is disposed within the second closed internal cavity 105. The first mass 101 does not fill the second closed internal cavity 105, and is configured to move within the second closed internal cavity 105. In the embodiment shown, the first mass 101 is arranged between resilient elements 106a, 106b. In the embodiment shown, the resilient elements 106a, 106b are disposed at (e.g., fixed to) opposite ends of the first mass 101. The resilient elements 106a, 106b may be springs. The resilient elements 106a, 106b are configured to control movement (e.g., oscillation) of the first mass 101 within the second closed internal cavity 105. Alternatively, the resilient elements 106a, 106b may be disposed on (e.g., fixed to) each end of the second closed internal cavity 105 and opposite ends of the first mass 101. In another alternative embodiment, the resilient elements 106a, 106b are disposed on (e.g., fixed to) each end of the second closed internal cavity 105 only, such that first mass 101 is able to move independently of the resilient elements 106a, 106b. In such an embodiment, resilient elements 106a, 106b are still configured to control oscillation of the first mass 101 within the second closed internal cavity 105.

The first closed internal cavity 102 and the second closed internal cavity 105 need not be strictly 'closed' e.g., air-tight or fluid-tight. It is sufficient that the first closed internal cavity 102 and the second closed internal cavity 105 each provide a cavity surface through which the second mass 103 and the first mass 101 respectively cannot pass through on impact. For example, such a cavity surface may be provided by providing a first closed internal cavity 102 defined by one or more walls comprising a plurality of wall regions separated from one another by a distance less than a minimum dimension of the second mass 103 (e.g., the one or more walls may comprise a grid, grill or grating structure).

In the embodiment shown in FIG. 1, the first closed internal cavity 102 comprises an elongated portion (e.g., in an axial or longitudinal direction as shown by arrow A in FIG. 1) having a constant or uniform cross-sectional shape (e.g., in a transverse direction as shown by arrow B in FIG. 1). The cross-sectional shape may comprise a substantially circular shape, a substantially square shape, a substantially polygonal shape or any other suitable shape (e.g., the first closed internal cavity 102 may be substantially cylindrical, substantially cuboidal or substantially prismatic). In the embodiment shown, the second mass 103 comprises a cross-sectional shape (e.g., in the transverse direction) substantially similar to the cross-sectional shape of the elongated portion of the first closed internal cavity 102. The first closed internal cavity 102 of the first mass 101 is therefore configured to ensure movement of the second mass 103 in a fixed direction (e.g., along a longitudinal axis of the elongated portion of the first closed internal cavity 102). Directing movement of the second mass 103 along a fixed axis may allow energy to be harvested most efficiently by ensuring the second mass 103 is oriented relative to the first mass in order to maximise the induced electrical current (e.g., such that movement of the second mass 103 causes a maximal magnetic flux of the magnetic material of the second mass 103 to be cut by the conductive material of the first mass 101). Alternatively, the first closed internal cavity 102 and the second mass 103 may be or comprise different shapes or configurations. The first closed internal cavity 102 may not be configured to limit movement of the second mass 103 to be along a fixed axis or in a fixed direction. The second mass 103 may be able to move in any direction within the first closed internal cavity 102.

Similarly, in the embodiment shown in FIG. 1, the second closed internal cavity 105 comprises an elongated portion (e.g., in an axial or longitudinal direction as shown by arrow A in FIG. 1) having a constant or uniform cross-sectional shape (e.g., in a transverse direction as shown by arrow B in FIG. 1). The cross-sectional shape may comprise a substantially circular shape, a substantially square shape, a substantially polygonal shape or any other suitable shape (e.g., the second closed internal cavity 105 may be substantially cylindrical, substantially cuboidal or substantially prismatic). In the embodiment shown, the first mass 101 comprises a cross-sectional shape substantially similar to the cross-sectional shape of the elongated portion of the second closed internal cavity 102. The second closed internal cavity 105 of the housing 104 is therefore configured to ensure movement of the first mass 101 is in a fixed direction (e.g., along a longitudinal axis of the elongated portion of the second closed internal cavity 105). In the embodiment shown, the longitudinal axis of the elongated portion of the first closed internal cavity 102 is coaxial with the longitudinal axis of the elongated portion of the second closed internal cavity 105. Directing movement of the second mass 103 may allow energy to be harvested most efficiently by concentrating elastic force produced by the first mass 101 oscillating between the resilient members 106a, 106b along a single direction in order to maximise relative movement between the first mass 101 and the second mass 103.

Figure 2:
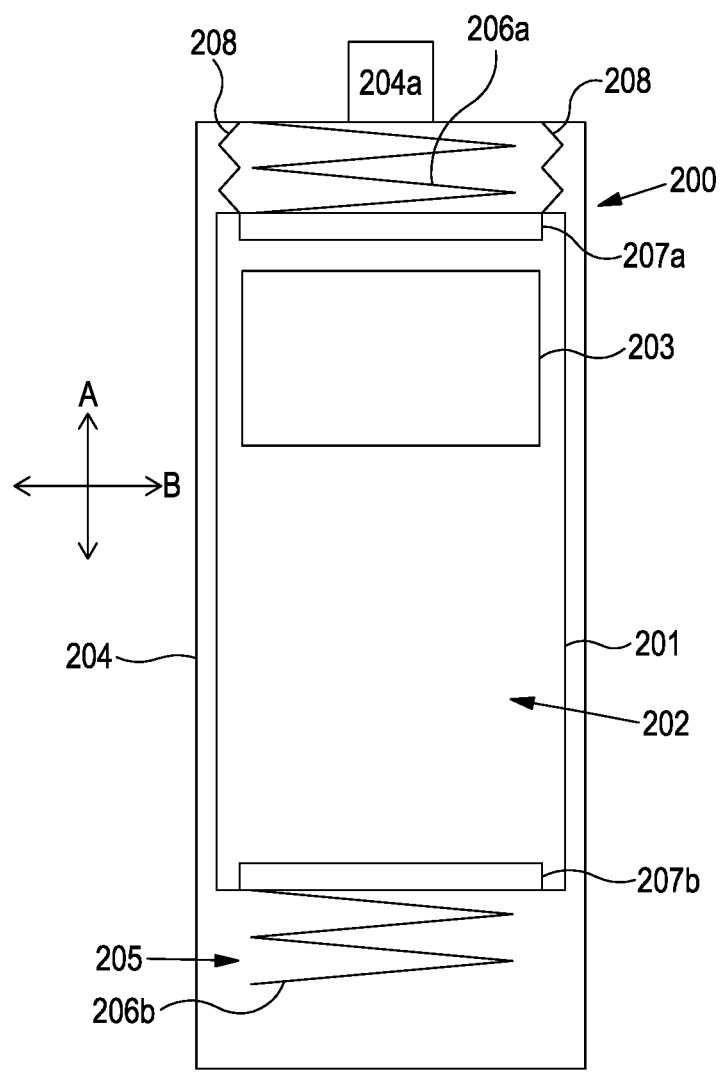
FIG. 2 shows another embodiment of a vibrational energy harvester employing magnetic springs for a second mass in accordance with the invention.

FIG. 2 shows an embodiment of a vibrational energy harvester 200 according to the invention. The vibrational energy harvester 200 comprises corresponding features to the vibrational energy harvester 100 as shown in FIG. 1. In addition, the vibrational energy harvester 200 comprises magnets or magnetic portions 207a, 207b located at (e.g., provided at or on) opposite ends of a first closed internal cavity 202. In the embodiment shown, the magnetic portions 207a, 207b extend from an internal surface of a first closed internal cavity 202. Alternatively, the magnetic portions 207a, 207b may be embedded in an internal surface of the first closed internal cavity 202 (e.g., embedded in a recess in the first mass 101), or integrally formed with the first mass 201. The magnetic portions 207a, 207b act as magnetic springs between which a second mass 203 comprising or manufactured from a magnetic material (e.g., the second mass 203 may be a magnet) can oscillate. The magnetic material may be or comprise at least one of Neodymium Iron Boron (NdFeB), AlNiCo magnetic alloy, Samarium Cobalt, Strontium Ferrite and Barium Ferrite. Using magnetic springs in conjunction with the second mass 203 may help to reduce or limit mechanical losses that are typically associated with mechanical springs (e.g., compression springs). Magnetic springs may also reduce the resonant frequency of the vibrational energy harvester 200, enabling energy from vibration frequencies typically associated with human motion (e.g., below 100 Hz, such as between 2 Hz and 20 Hz) to be harvested. Low resonant frequencies are generally achieved by increasing both a mass and a size of vibrational energy harvesters. Magnetic springs enable energy to be harvested from low frequencies (e.g., below 100 Hz, such as between 2 Hz and 20 Hz) without increasing a mass or a size of the vibrational energy harvester 200, as magnetic springs can require less space than mechanical springs. Magnetic springs also introduce non-linear contributions to the dynamics of the vibrational energy harvester 200 that can increase the bandwidth of the vibrational energy harvester 200. In contrast, resilient elements 206a, 206b are mechanical elements such as compression springs which exhibit mechanical elastic behaviour to govern oscillation of a first mass 201. Resilient elements 206a, 206b differ from magnetic springs in that resilient elements 206a, 206b utilise elastic force generated in response to mechanical deformation (hence, mechanical elements) of the resilient elements 206a, 206b to govern oscillation of the first mass 201, rather than a magnetic interaction as utilised in magnetic springs. Using mechanical elements such as compression springs in place of magnetic springs to control oscillation of the first mass 201 may reduce the number of magnetic components which can interfere with magnetic material of the second mass 203 and potentially reduce a power output of the vibrational energy harvester 200.

In alternative embodiments, the second mass 203 may oscillate between mechanical springs similar to resilient elements 206a, 206b. In alternative embodiments, magnetic springs are used in place of resilient elements 206a, 206b (it will be appreciated this also applies with respect resilient elements 106a, 106b of the vibrational energy harvester 100 shown in FIG. 1).

In the embodiment shown in FIG. 1 (and similarly in FIG. 2), the first mass 101 and the second mass 103 are configured to impact each other whilst moving within the first closed internal cavity 102 and the second closed internal cavity 105 respectively. For example, whilst the first mass 101 is moving within the second closed internal cavity 105, an internal surface of the first closed internal cavity 105 may impact the second mass 103. It will be appreciated that the same is true for the first mass 201 and the second mass 203 of the vibrational energy harvester 200 as shown in FIG. 2.

Impact between the first mass 101 and the second mass 103 allows momentum transfer between the two masses and can provide velocity amplification of the first mass 101 and/or the second mass 103, depending on the relative masses of the first mass 101 and the second mass 103. For example, the second mass 103 may be moving at a first velocity within the first mass 101, whilst the first mass 101 may be moving at a second velocity. A collision or impact between the second mass 103 and the first mass 101 may transfer momentum from the first mass 101 to the second mass 103 such that the second mass 103 travels at a third velocity having a greater amplitude (i.e., speed) than the first velocity of the second mass 103. Velocity amplification may therefore result in an increased speed of movement of the second mass 103 relative to the first mass 101, or vice versa. An increased speed of movement of the second mass 103 relative to the first mass 101 increases a magnitude of the induced electrical voltage in the conductive material of the first mass 101, which results in a greater induced electrical current in the conductive material of the first mass 101. In turn, an output power of the vibrational energy harvester 100 is increased. Locating the second mass 103 inside the first mass 101 can reduce an overall volume of the vibrational energy harvester 100. Such a configuration also enables simple implementation of velocity amplification to improve an output of the vibrational energy harvester 100. Impacts between the first mass 101 and the second mass 103 can also introduce non-linear mechanical effects which can enhance the frequency response of the vibrational energy harvester 100. The non-linear effects introduced by impacts between the first mass 101 and the second mass 103 can increase the bandwidth relative to simple linear spring-mass resonator systems. The overall power spectrum of the vibrational energy harvester 100 is the result of the superposition of all of its vibrational modes. Similarly, impacts between the first mass 101 and the housing 104 can also provide velocity amplification. It will be appreciated that the same is true for the first mass 201, the second mass 203 and the housing 204 of the vibrational energy harvester 200 as shown in FIG. 2.

In the embodiment shown, the second mass 103, 203 or comprises one or more magnets. In some embodiments, the second mass 103, 203 is or comprises a stack of magnets. In some embodiments, magnets in the stack of magnets forming the second mass 103, 203 are arranged to maximise the gradients in the magnetic field. In some embodiments, magnets in the stack of magnets forming the second mass 103, 203 are arranged to maximise the magnetic field intensity along a length of the second mass 103, 203 (rather than concentrating magnetic field intensity at opposing poles or ends of the second mass 103, 203). The stack of magnets forming the second mass 103, 203 may comprise one or more of a Halbach stack, a stack of opposing axially polarised magnets and a stack of axially polarised magnets.

In typical vibrational energy harvesters, a conductive material is disposed in a fixed location on or relative to a housing, rather than on a moving, oscillating or vibrating part of the vibrational energy harvester. Durability of electrical contacts between the conductive material and an electrical output portion, e.g., connector (usually located on the housing), which can be used to deliver the electrical power generated by the vibrational energy harvester to an external device, is therefore not an issue. In contrast, during operation of the vibrational energy harvester 100 the conductive material of the first mass 101 is moving relative to the housing 104 to maximise the relative velocity between the conductive material of the first mass 101 and the magnetic material of the second mass 103. In the embodiment shown in FIG. 1 (and similarly in FIG. 2), the housing 104 comprises a connector 104a which is configured to deliver the electrical power generated by the vibrational energy harvester to an external device such as wireless sensor nodes and low power electronic devices. In the embodiment shown, the conductive material of the first mass 101 is electrically connected to the connector 104a via one or more mechanical springs 108. The springs 108 may be connected directly to the conductive material of the first mass 101. Alternatively an intermediate conductor (e.g., a wire) may connect the conductive material of the first mass 101 to the springs 108 (e.g., if the conductive material of the first mass 101 is not located at least in part near an end of the first mass 101). In some embodiments, the elastic constant of the springs 108 is lower than the elastic constant of the resilient elements 106a, 106b so as not to affect the oscillatory behaviour of the first mass 101 within the housing 104 (e.g., the dynamics of the first mass 101 are not affected). Connecting the conductive material of the first mass 101 to the connector 104a using the springs 108 may increase the operational lifetime of the electrical contacts between the conductive material of the first mass 101 and the connector 104a. The springs 108 may be more robust and be less susceptible to vibrational motion over numerous operational cycles when compared to, for example, typical soldered contacts. In some embodiments, the springs 108 comprise or are manufactured from stainless steel. It will be appreciated that the above is true of springs 208 of the vibrational energy harvester 200 as shown in FIG. 2. Alternatively, the conductive material of the first mass 101, 201 may be connected to the connector 104a, 204a via soldered contacts and a length of conductive wire.

FIG. 3A shows an embodiment of a first mass 301 configured to be used in a vibrational energy harvester such as the vibrational energy harvesters 100, 200 described above. In the embodiment shown, the first mass 301 comprises one or more conductive coils or windings 309 forming the conductive material of the first mass 301. In some embodiments, the coils or windings 309 are or comprise copper. The first mass 301 comprises a hollow core 310. The hollow core 310 may be open at one or both ends, or may be closed at both ends. In the embodiment shown, a plurality of arms or projections 311 extend outwards from the hollow core 310, as shown more clearly in FIG. 3B. In the embodiment shown, the core 310 comprises a substantially cylindrical shape, but the core 310 may alternatively be or comprise any suitable shape (e.g., the core 310 may be substantially cuboidal or substantially prismatic). The plurality of arms 311 is disposed on the core 310 equidistant from one another along an axial length of the core 310. Alternatively, the arms 311 may be disposed at varying intervals along an axial length of the core 310. A space is formed between each adjacent pair of arms 311 in which each of the coils or windings 309 is disposed. The arms 311 may help to locate the coils 309 accurately and prevent movement of the coils 309 relative to each other during vibration of the vibrational energy harvester 100, 200. In the embodiment shown, the coils 309 are wound from a single length of wire. Each of the coils 309 may be wound clockwise or anticlockwise. Adjacent coils 309 may alternate between being wound clockwise and being wound anti-clockwise to minimise current cancellation. In some embodiments, the coils 309 are wound from multiple lengths of wire that are electrically connected to each other. Adjacent coils 309 are connected in series and anti-series in order to minimise current cancellation. In the embodiment shown, the first mass 301 comprises seven coils 309, but may alternatively comprise any number of coils (e.g., 1, 2, 3, 4, 5, 6, 8, 9, 10 and so on). In the embodiment shown, each of the arms 311 comprises one or more arm portions 311a separated by one or more channels or gaps 312. Adjacent coils 309 may be connected to one another via one or more of the channels or gaps 312. In some embodiments, the arms 311 are not used or present. In some embodiments, each of the coils 309 may not be disposed between adjacent arms 311 extending from the core 310, but may be disposed on an external surface of the core 310 of the first mass 301 (e.g., wrapped around the core 310). In some embodiments, the core 310 is manufactured from polyoxymethylene (POM). Alternatively, the core 310 may be manufactured from at least one another suitable material such as polycarbonate, acetal, Teflon®, a nonmagnetic material such as aluminium etc. In some embodiments, the core 310 is manufactured using three-dimensional (3D) printing.

FIGS. 3C and 3D show a cap 313 configured, together with the core 310 as shown in FIGS. 3A and 3B, to form a first closed internal cavity 302 of the first mass 301. As noted above, in some embodiments, the core 310 may be open at one or both ends. A cap 313 fits over one or both open ends of the core 310, forming the first closed internal cavity 302 in which a second mass 103 may be disposed and move within. In the embodiment shown in FIG. 3C, an external (e.g. top) surface of the cap 313 comprises a recess 314 for receiving a resilient element 106a, 106b. Walls enclose and define the recess 314. The walls have a height h sufficient to prevent over-compression of (and therefore damage to) the resilient element 106a, 106b during oscillation of the first mass 301. An end surface of the walls of the recess 314 also functions as a mechanical stopper for impact between the first mass 301 and the second mass 103, 203. The same is true with respect to resilient elements 206a, 206b as shown in FIG. 2. Alternatively, the recess 314 may be used to locate magnetic material to form one or more magnetic springs configured to control oscillation of the first mass 301.

In the embodiment shown in FIGS. 3A and 3B, the coils 309 are disposed on the first mass 301 which is configured to move within a housing 104 (see discussion of FIG. 1 above). As discussed above, that arrangement is such that relative velocity between the coils 309 and the second mass 103 can be maximised. As also discussed above, the conductive material of the first mass 301 may be connected to a connector 104a via one or more springs 108. In the embodiment shown in FIG. 3C, a hook or aperture 315 is provided on or in the top surface of the cap 313. The hook 315 is configured to connect to a spring 108 (not shown) to form an electrical contact between the coils 309 and the connector 104a (not shown, but shown in FIG. 1). The springs 108 may be connected to only one of the caps 313. Alternatively, the springs 108 may be connected to the conductive material of the first mass 301 (e.g., coils 309), either directly or via the cap 313, using, for example, a conductive adhesive or another conductive connection mechanism. A cap 313 in accordance with the above may be used with the springs 208 and connector 204a of the vibrational energy harvester 200 as shown in FIG. 2.

FIG. 3D shows an internal (e.g., bottom) view of the cap 313. In the embodiment shown, an underside of the cap 313 comprises a recess 316 configured to contain magnetic portions 207a, 207b (discussed with respect to FIG. 2 above). A depth of the cavity may be equal to or greater than a thickness of the magnetic portions 207a, 207b. By retaining the magnetic portions 207a, 207b within the recess 316 of the cap 313, the magnetic portions 207a, 207b are prevented from colliding directly with the second mass 203 during vibration of the vibrational energy harvester 100. An inner surface of the cap 313 (level with an open end of the recess 316) acts as a mechanical stopper for impacts between the first mass 301 and the second mass 103, 203. Alternatively, the underside of the cap 313 may not comprise a recess, and the magnetic portions 207a, 207b may extend from the underside of the cap 313 into the first closed internal cavity 302 defined by the cap 313 and the core 310. In the embodiment shown, the underside of the cap 313 also comprises one or more grooves 317. In some embodiments, the one or more grooves 317 align with one or more corresponding mating flanges 317a. The mating flanges 371a are located on one or both ends of the core 310. In some embodiments, interaction of the grooves 317 with the mating flanges 317a locates and retains or locks in place the cap 313 on the core 310. Additionally, one or more grooves 318 are located on an internal surface of the core 310 (the core 310 at least partially defining the first internal cavity 302, as shown in FIG. 3B). The grooves 318 are configured to receive corresponding flanges on the second mass 103 (not shown, but discussed above with respect to FIG. 1) to minimise contact points (and therefore friction) between the first mass 301 and the second mass 103 whilst simultaneously controlling the movement of the second mass 103 within the first mass 101. The interaction of the grooves 318 and the corresponding flanges on the second mass 103 may also prevent rotation of the second mass 103 within the first closed internal cavity 302 whilst the second mass 103 is oscillating or moving within the first closed internal cavity 302. It will be appreciated that the above may be utilised in respect of the second mass 203 of the vibrational energy harvester 200 as shown in FIG. 2. Alternatively, the core 310 may not comprise respective grooves 318, and the second mass 103, 203 may not comprise corresponding flanges.

Figure 3E:
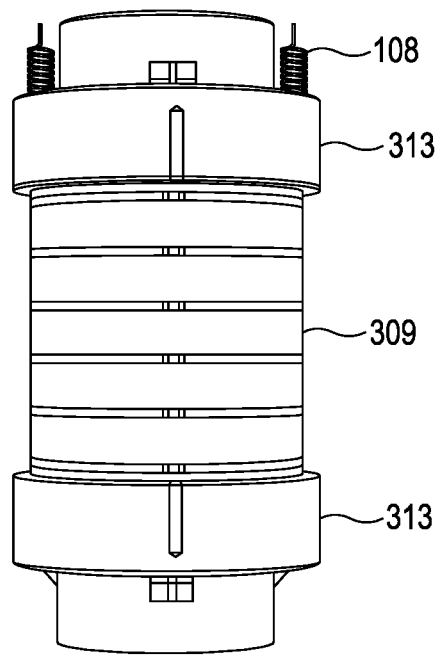

FIG. 3E shows the embodiment of the first mass 301 of FIGS. 3A to 3D in an assembled state together with springs 108 configured to connect conductive material of the first mass 301 to the connector 104a, 204a (not shown) of the housing 104, 204 of the vibrational energy harvester 100, 200 as shown in FIGS. 1 and 2.

Figures 4A, 4B:
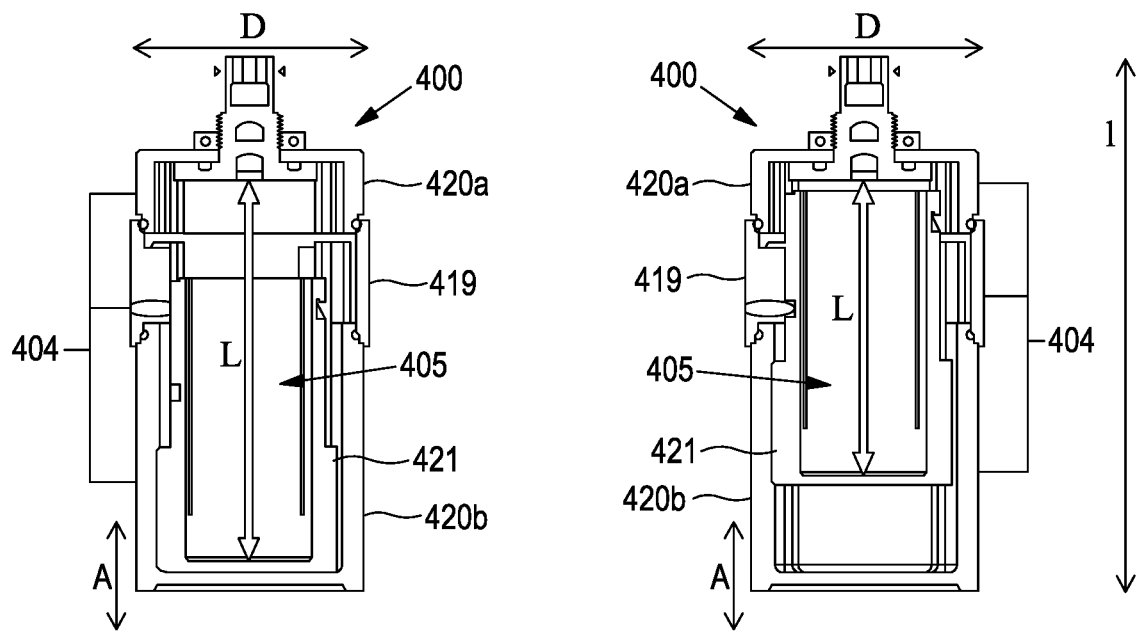
FIGS. 4A to 4D show various views of a housing of an embodiment of a vibrational energy harvester in accordance with the invention.

FIG. 4 shows an embodiment of a vibrational energy harvester 400 in accordance with the invention. The vibrational energy harvester 400 comprises an adjuster 419 configured to adjust a size of a second closed internal cavity 405 comprised by a housing 404 of the vibrational energy harvester 400, without altering an overall size of the vibrational energy harvester 400. In the embodiment shown, a length of the second closed internal cavity 405 (e.g., in an axial or longitudinal direction, as indicated by the arrow A in FIGS. 4A and 4B) is adjustable by the mechanism 419. In the embodiment shown, the vibrational energy harvester 400 comprises a housing 404 having a first (e.g., upper) portion 420a and a second (e.g., lower) portion 420b. A cam 421 is disposed within the housing 404. The second closed internal cavity 405 is formed by the housing 404 and the cam 421. The adjuster 419 is disposed between the upper portion 420a and the lower portion 420b of the housing 404. In the embodiment shown, the adjuster 419 forms a part of the housing 404. The adjuster 419 is rotatably coupled to both the upper portion 420a and the lower portion 420b of the housing 404. The housing 404 therefore comprises two fixed portions 420a, 420b and a moveable portion 419, one of the fixed portions disposed either side of the moveable portion (e.g., adjuster 419). Alternatively, the housing 404 may comprise one fixed portion and one moveable portion. For example, the adjuster 419 may form one of the upper portion 420a and the lower portion 420b of the housing 404. The adjuster 419 may be rotatably coupled to the other portion 420a, 420b of the housing 404. The adjuster 419 may be connected or coupled to the other portion(s) 420a, 420b of the housing 404 using an O-ring seal to prevent water penetration into the vibrational energy harvester 400. Alternatively, the housing 404 may comprise a plurality of portions that are each moveable or rotatable with respect to one another.

Figure 4C:
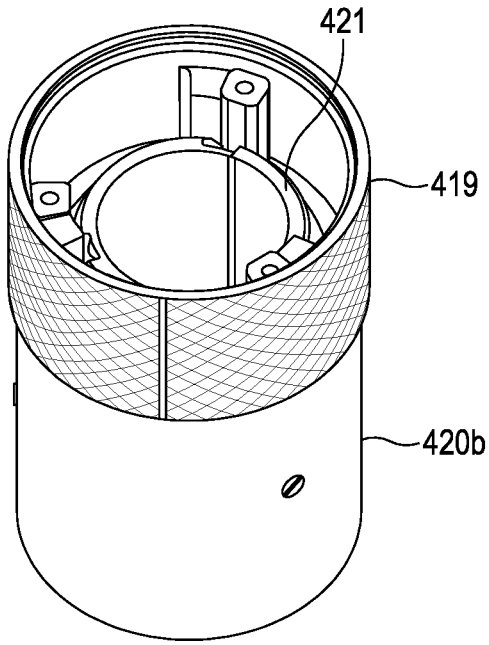
Figure 4D:
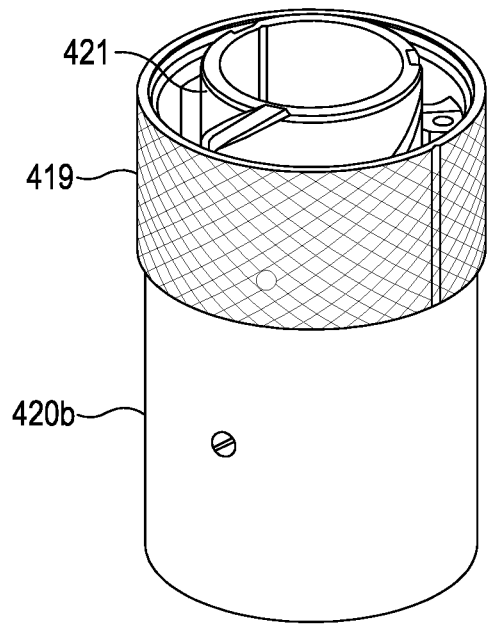

The adjuster 419 is coupled to the cam 421 such that rotation of the adjuster 419 relative to the upper portion 420a and the lower portion 420b of the housing 404 causes axial displacement of the cam 421 within the housing 404. Axial displacement of the cam 421 within the housing 404 causes the position of the cam 421 within the housing to change, thereby adjusting a size (e.g., length in an axial or longitudinal direction) of the second closed internal cavity 405. The size of the second closed internal cavity 405 is therefore adjustable using the adjuster 419. This is illustrated in FIGS. 4A and 4B, wherein a length L of the second closed internal cavity 405 is greater in FIG. 4A than in FIG. 4B. This is also illustrated in FIGS. 4C and 4D (corresponding to FIGS. 4A and 4B respectively), which shows an isometric view of the embodiment of FIGS. 4A and 4B without the upper portion 420a of the housing 404. The cam 421 is situated higher within the housing 404 in FIGS. 4A and 4C then in FIGS. 4B and 4D, illustrating how the size of the second closed internal cavity 405 may be adjusted.

By adjusting the length L of the second closed internal cavity 405 (i.e., by adjusting a single geometrical parameter of the vibrational energy harvester 400), a resonant frequency of the vibrational energy harvester 400 can be tuned. For example, an outer diameter D of the vibrational energy harvester 400 may be approximately 40 mm, and an overall external length l of the vibrational energy harvester 400 may be approximately 74 mm (e.g., a size comparable with a D battery). By changing a length L of the second closed internal cavity 405 from, for example, approximately 64 mm to approximately 53 mm, a resonant frequency of the vibrational energy harvester can be adjusted by up to substantially 20 Hz (e.g., between substantially 15 Hz and 35 Hz). For a second internal cavity 405 having a length adjustable between substantially 80 mm and substantially 40 mm or between substantially 70 mm and substantially 50 mm, a resonant frequency of the vibrational energy harvester can be adjusted by up to substantially 40 Hz (e.g., between substantially 5 Hz and substantially 45 Hz) or substantially 30 Hz (e.g., between substantially 10 Hz and substantially 40 Hz) respectively. The frequency response of the vibrational energy harvester can also be altered by modifying an elastic constant of elements configured to control oscillation of the first mass 101, 201, 301 and/or the second mass 103, 203 (e.g., resilient elements such as springs, or magnetic springs). Additionally, the frequency response of the vibrational energy harvester 400 may be altered by modifying a mass of the first mass 101, 201, 301 and/or the second mass 103, 203. This concept can be extended to vibrational energy harvesters 400 of different sizes, but is particularly suitable for small, low mass devices intended to harvest energy from lower frequencies, e.g., below 100 Hz, or frequencies typically associated with human motion, industrial machinery (such as pumps and compressors) and various types of transport (such as automobiles, aircraft, rail vehicles). An adjustable vibrational energy harvester 400 for which the resonant frequency can be tuned may be used to harvest energy efficiently in a variety of operating environments or applications, each exhibiting (a range of) different primary vibration frequencies. In conjunction with velocity amplification as discussed above, a small sized, low mass device such as vibrational energy harvester 400 can be used to provide improved output power at a variety of lower frequencies typically associated with human motion. Alternatively, an overall length l of the vibrational energy harvester may be adjusted to adjust the length L of the second closed internal cavity 405 in an axial or longitudinal direction A. It will be appreciated that the housing 404 may be implemented with the vibrational energy harvesters 100, 200 as shown in FIGS. 1 and 2.

Figure 5A:
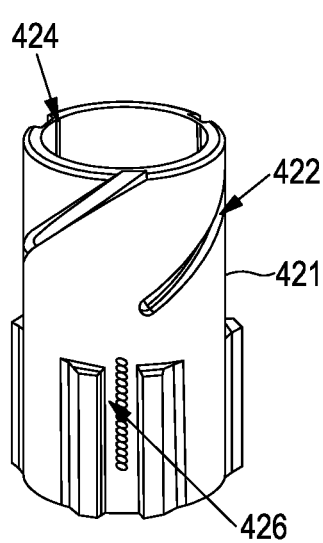
FIGS. 5A to 5G show a cam and an adjuster of embodiments of a vibrational energy harvester in accordance with the invention.
Figure 5B:
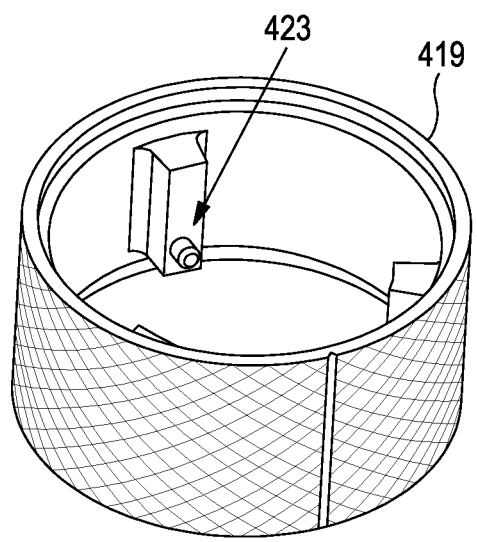

The adjuster 419 and the cam 421 are shown in greater detail in FIGS. 5A and 5B respectively. In the embodiment shown, the adjuster 419 is configured to be coupled to the cam 421 via one or a plurality of helical channels 422 disposed on an outer surface of the cam 421, the or each of the helical channels 422 configured to engage with a or one of a plurality of corresponding protrusions 423 on an internal surface of the adjuster 419. In the embodiment shown, three helical channels 422 and three protrusions 423 are included (one protrusion 422 to locate and move in each channel 423), but it will be appreciated that any number of corresponding helical channels 422 and protrusions 423 could be used. When assembled, and when the adjuster 419 is rotated relative to the other portion(s) 420a, 420b of the housing 404, the protrusions 423 move within and follow the helical channels 422, resulting in axial displacement of the cam 421 within the housing 404. It will be appreciated that other arrangements could be implemented to couple the adjuster 419 to the cam 421 such that rotation of the adjuster 419 relative to other portion(s) 420a, 420b of the housing 404 results in axial displacement of the cam 421 within the housing 404. For example, the adjuster 419 may be coupled to the cam 421 via corresponding screw threads on an internal surface of the adjuster 419 and an external surface of the cam 421 respectively.

Figure 6:
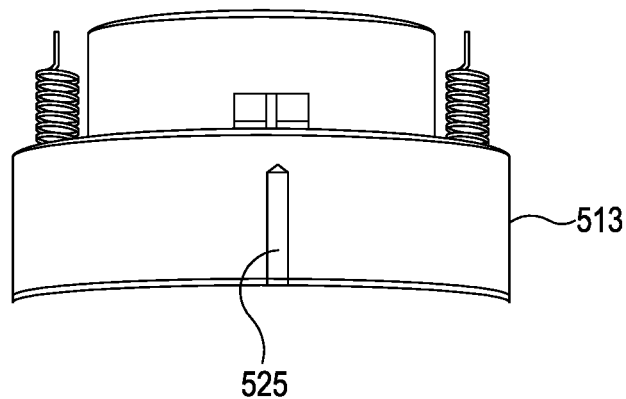
FIG. 6 shows a cap of a first mass of an embodiment of a vibrational energy harvester in accordance with the invention.

In the embodiment shown in FIGS. 4A to 4D and 5A, the cam 421 has or comprises a hollow cylindrical shape. In the embodiment shown, the cam 421 has one closed end and one open end. A first mass 101 (not shown, for example as described above) is configured to be located within and move (e.g., oscillate) within the second closed internal cavity 405 defined by the cam 421 and the housing 404. A resilient element 106a, 106b (not shown) is configured to be located at the closed end of the hollow cylindrical shape of the cam 421. In the embodiment shown, the first mass 101 is configured to be at least partially disposed within the hollow cylindrical shape of the cam 421 at any point of oscillation of the first mass 101 within the second closed internal cavity 405. In the embodiment shown, one or more grooves 424 on an internal surface of the cam 421 are configured to engage with one or more corresponding flanges (not shown) on the first mass 101 to prevent rotation of the first mass 101 during oscillation within the second closed internal cavity 405, and to reduce friction by minimising contact points between the first mass 101 and the cam 421. FIG. 6 shows an embodiment of a cap 513 (forming a part of the first mass 101) comprising flanges 525 on an external surface of the cap 513 configured to engage with the grooves 424 of the cam 421. In some embodiments, the cam 421 may be open at both ends, but may comprise at one end an annular ring or flange on which a resilient element 106a, 106b may be disposed and configured to interact with the first mass 101. Alternatively, the first mass 101 may not comprise flanges, and the internal surface of the cam 421 may not comprise corresponding grooves. The first mass 101 may be free to rotate as it oscillates within the second closed internal cavity 405. It will be appreciated it that the cam 421 and the housing 404 may also be implemented with the first masses 201, 301 as shown in FIGS. 2 and 3.

Alternatively, the cam 421 may be or comprise a solid cylindrical shape. A resilient element 106a, 106b may be disposed between (e.g., in contact with both) a flat external (e.g., top) surface of the solid cylindrical cam 421 and the first mass 101. The cam 421 may not comprise a hollow cylindrical portion configured to at least partially enclose the first mass 101 during oscillation of the first mass 101 within the second closed internal cavity 405. The first mass 101 may comprise one or more flanges (not shown) configured to engage with one or more corresponding grooves on an internal surface of the housing 404 to prevent rotation of the first mass 101 during oscillation. Alternatively, the first mass 101 may not comprise flanges, and an internal surface of the housing 404 may not comprise corresponding grooves. The first mass 101 may be free to rotate as it oscillates within the second closed internal cavity 405. An outer surface of the solid cylindrical cam 421 may comprise one or more helical channels 422 each configured to engage with one of a plurality of corresponding protrusions 423 on an internal surface of the adjuster 419, as described above (or alternatively, an outer surface of the cam 421 and an internal surface of the adjuster 419 may comprise corresponding screw threads, as described above).

The cam 421 may be provided with a detent to hold the cam 421 in a particular axial position with respect to the housing 404. The detent may be or comprise a plunger, catch or other releasable fixing mechanism. For example, returning to FIG. 5A, in the embodiment shown, the cam 421 comprises a first plurality of apertures, holes or indentations 426 located equidistant from one another along an axial length of the cam 421. The apertures, holes or indentations 426 are configured to interact with a corresponding spring-loaded plunger (not shown) located on an internal surface of the housing 404. The spring-loaded plunger is configured to engage with one of the holes 426 to prevent unintended axial displacement of the cam 421 relative to the housing 404 during vibration of the vibrational energy harvester 400. However, the spring-loaded plunger is also configured to allow axial displacement of the cam 421 if sufficient force is applied to overcome the elastic resistance of the spring-loaded plunger during rotation of the adjuster 419. The plurality of holes 426 are spaced apart from one another according to a desired incremental change in size (e.g., length) of the second closed internal cavity 405. For example, the plurality of holes may be spaced between substantially 0.25 mm and 1 mm apart from one another, for example substantially 0.5 mm apart from one another (e.g., measuring from the centre of adjacent holes), allowing fine adjustment of the size of the second closed internal cavity 405. Increments may be indicated to a user of the vibrational energy harvester 400 using indicia on an outer surface of one or both of the adjuster 419 and the housing 404, to indicate an axial position of the cam 421 within the housing 404. In some embodiments, further pluralities of holes 426 may be disposed at different radial locations around the cam 421, each configured to interact with a separate spring-loaded plunger. Alternatively, a frictional force between the protrusions 423 and the helical channels 422 (or alternatively, for example, corresponding screw threads) on the cam 421 and the adjuster 419 respectively may be large enough to resist unintended axial displacement of the cam 421 relative to the housing during vibration of the vibrational energy harvester 400.

Figure 5C:
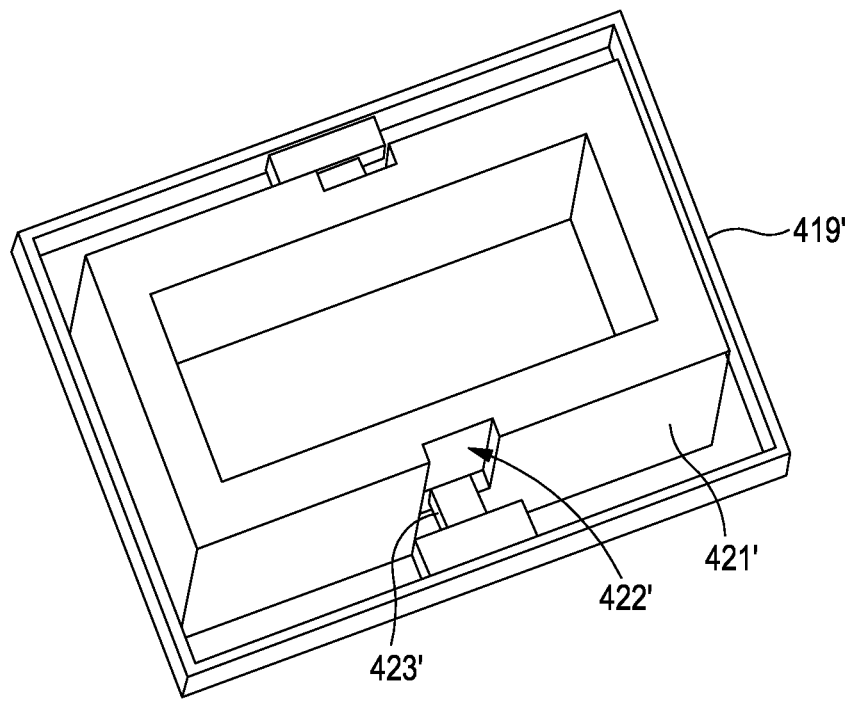

In other embodiments, a substantially similar approach for adjusting a size of a second internal cavity of the vibrational energy harvester may be used for other device geometries in accordance with the present disclosure. For example, a vibrational energy harvester in accordance with the present disclosure may be or comprise a substantially non-cylindrical shape. In some embodiments, a vibrational energy harvester is or comprises a substantially parallelepiped shape. FIG. 5C shows a cam or slider (for example, a cam configured to move axially as a result of linear, axial force rather than on application of rotational force) 421' having a substantially rectangular parallelepiped shape. The function of the cam or slider 421' is substantially similar to the function of the cam 421 described with respect to FIGS. 4A to 4D, 5A and 5B. In the embodiment shown, the slider 421' is hollow. The slider 421' comprises one closed end. A first mass 101 is configured to oscillate in a second closed internal cavity defined between an internal surface of a housing of the vibrational energy harvester and the closed end of the slider 421', similar to the cam 421 described above. Alternatively, the slider 421' may be solid, such that the first mass 101 is configured to oscillate in a second closed internal cavity defined between an internal surface of a housing the vibrational energy harvester and an outer surface of the cam 421'. In the embodiment shown, the hollow recess defined by the slider 421' is substantially the same shape as the slider 421' (e.g., a substantially rectangular parallelepiped). Alternatively, the hollow recess defined by the slider 421' may be or comprise a different shape to the slider 421'. The hollow recess defined by the slider 421' is configured to at least partially accommodate a first mass 101. In some embodiments, the first mass 101 has a substantially identical shape to the shape of the hollow recess of the slider 421'. For example, the hollow recess of the slider 421' may be or comprise a substantially cylindrical shape, for example to accommodate a substantially cylindrical first mass 101 (such as that described above and shown in FIGS. 3A to 3E).

Figures 5D, 5E:
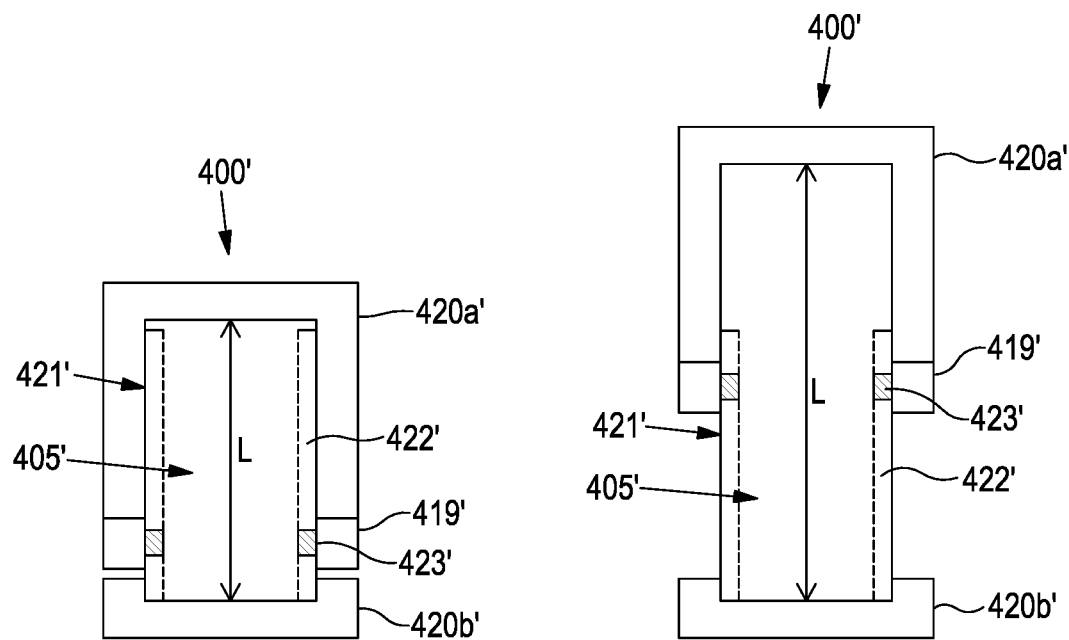

One or more of the first mass 101, an adjuster 419' and one or more portions of a housing of the vibrational energy harvester having a substantially rectangular parallelepiped shape may be or comprise a substantially rectangular parallelepiped shape. As shown in FIG. 5C, the adjuster 419' is configured to be coupled to the slider 421' via one or a plurality of channels 422' disposed on an outer surface of the slider 421'. The channels 422' may extend in a direction substantially parallel to a longitudinal axis of the vibrational energy harvester 400'. The channels 422' may have a depth less than a wall thickness of a hollow slider 421'. Each of the channels 422' is configured to engage with a or one of a plurality of corresponding protrusions 423' on an internal surface of the adjuster 419'. In the embodiment shown, two channels 422' and two protrusions 423' are shown, but it will be appreciated that any number of corresponding channels 422' and protrusions 423' could be used. In the embodiment shown, the channels 422' are substantially linear. When the vibrational energy harvester is assembled, the adjuster 419' may be displaced axially relative to the cam 421, following a path of the protrusions 423' within the channels 422'. This is illustrated in more detail in FIGS. 5D and 5E respectively. FIG. 5D shows a vibrational energy harvester 400' comprising a housing 404', an adjuster 419' and a slider 421'. In the embodiment shown, the adjuster 419' forms a part of the housing 404'. The housing 404' comprises an upper portion 420a' and a lower portion 420b'. In the embodiment shown, the adjuster 419' is affixed to the upper portion 420a' of the housing 404'. When the adjuster 419' is axially displaced, for example by applying an axial force to the adjuster 419', (with protrusions 423' of the adjuster 419' travelling within channels 422' of the slider 421'), a size (e.g., a length in an axial or longitudinal direction) of a second closed internal cavity 405' of the vibrational energy harvester 400' (in the embodiment shown, defined between a closed end of the hollow slider 421' and an internal surface of the upper portion 420a' of the housing 404) may be increased or decreased. This is illustrated by the difference in a length L in FIGS. 5D and 5E respectively, with the adjuster 419' positioned at different axial displacements relative to the slider 421' (L indicating a size of the second closed internal cavity 405'). In so doing, a resonant frequency of the vibrational energy harvester 400' may be adjusted in a similar manner as that described above. To retain the slider 421' in a desired axial position relative to the housing 404', a detent may be provided. For example, the slider 421' may comprise a plurality of apertures, holes or indentations in an outer surface of the slider 421' The apertures, holes or indentations may be located equidistant from one another along an axial length of the slider 421'. The apertures, holes or indentations may be configured to engage with a corresponding spring-loaded plunger located on an internal surface of the adjuster 419' or the upper portion 420a' of the housing 404', substantially as described in respect of the vibrational energy harvester 400. The skilled person will be aware that such an arrangement could be implemented in a vibrational energy harvester having a different device geometry other than substantially parallelepiped (e.g., substantially rectangular parallelepiped). For example, the arrangement described with respect to FIGS. 5C to 5E could be implemented in a vibrational energy harvester having a cylindrical device geometry, or having a polygonal prism device geometry.

Figure 5F:
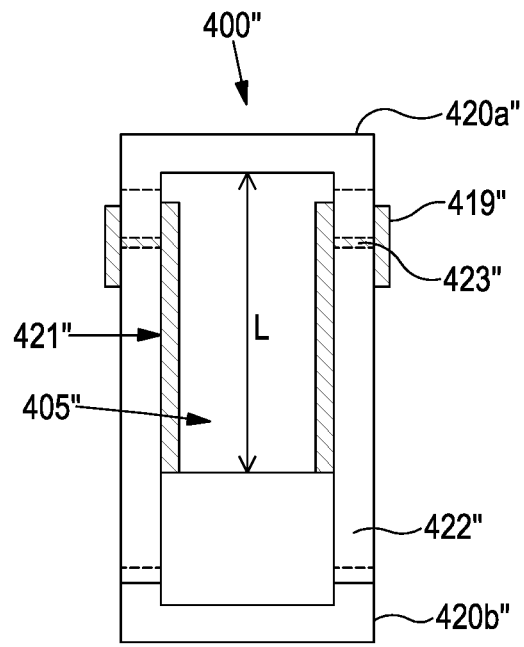
Figure 5G:
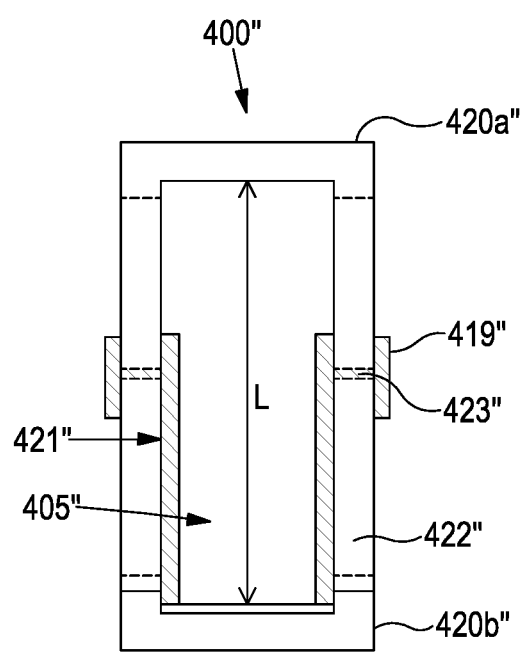

In the embodiment shown in FIGS. 5D and 5E, an external size of the vibrational energy harvester 400' increases as the size of the second closed internal cavity 405' increases. In alternative embodiments of a vibrational energy harvester 400", as shown in FIGS. 5F and 5G, an adjuster 419" may be affixed to a slider 421" rather than to an upper portion 420a" of a housing 404". One or more sides of the housing 404" (e.g., one or more sides of the upper portion 420a" of the housing 404") may comprise a channel 422" extending through a thickness of the housing 404". The channels 422" may extend in a direction substantially parallel to an axial direction (e.g., a longitudinal direction) of the vibrational energy harvester 400". The adjuster 419" may form a part of the housing 404" (e.g., it may form a part of an external surface of the vibrational energy harvester 400"). The adjuster 419" may be affixed to the slider 421" (located within the housing 404") via one or more protrusions 423". Each protrusion 423" may extend through a channel 422" in a side of the housing 404" and be attached to both the adjuster 419" and the slider 421" (as indicated by the hatching in FIGS. 5F and 5G). A width of the adjuster 419" may be larger than a width of a channel 422" to prevent the adjuster from falling through a channel 422". Accordingly, axial movement or displacement (e.g., in a longitudinal direction of the vibrational energy harvester 400") of the adjuster 419" relative to the housing 404" results in axial movement or displacement of the slider 421" within the housing 404". Axial movement of the adjuster 419" and the slider 421" is guided by the engagement or interaction of the protrusions 423" with the channels 422". A size of a second closed internal cavity 405" in the housing 404" (in the embodiment shown, defined between an internal surface of the housing 404" and a closed end of the hollow slider 421") of the vibrational energy harvester may be increased or decreased. This is illustrated by the difference in a length L in FIGS. 5F and 5G respectively, with the adjuster 419" (and therefore the slider 421") positioned at different axial displacements relative to the housing 404" (L indicating a size of the second closed internal cavity 405"). In so doing, a resonant frequency of the vibrational energy harvester 400" may be adjusted in a similar manner as that described above. To retain the slider 421" in a desired axial position relative to the housing 404", a detent may be provided. For example, the slider 421" may comprise a plurality of apertures, holes or indentations in an outer surface of the slider 421". The apertures, holes or indentations may be located equidistant from one another along an axial length of the slider 421". The apertures, holes or indentations may be configured to engage with a corresponding spring-loaded plunger located on an internal surface of the housing 404', substantially as described in respect of the vibrational energy harvester 400. Alternatively, a spring-loaded plunger may be provided on an external surface of the slider 421" and configured to interact with apertures, holes or indentations in an inner surface of the housing 404". Alternatively, a spring-loaded plunger may be provided on an internal surface of the adjuster 419" and configured to interact with apertures, holes or indentations in an outer surface of the housing 404". The embodiment shown in FIGS. 5F and 5G enables a size of the second closed internal cavity 405" to be adjusted without altering an external size of the vibrational energy harvester 400". The skilled person will be aware that such an arrangement could be implemented in a vibrational energy harvester having a different device geometry other than substantially parallelepiped (e.g., substantially rectangular parallelepiped). For example, the arrangement described with respect to FIGS. 5F to 5G could be implemented in a vibrational energy harvester having a cylindrical device geometry, or having a polygonal prism device geometry.

Figure 7:
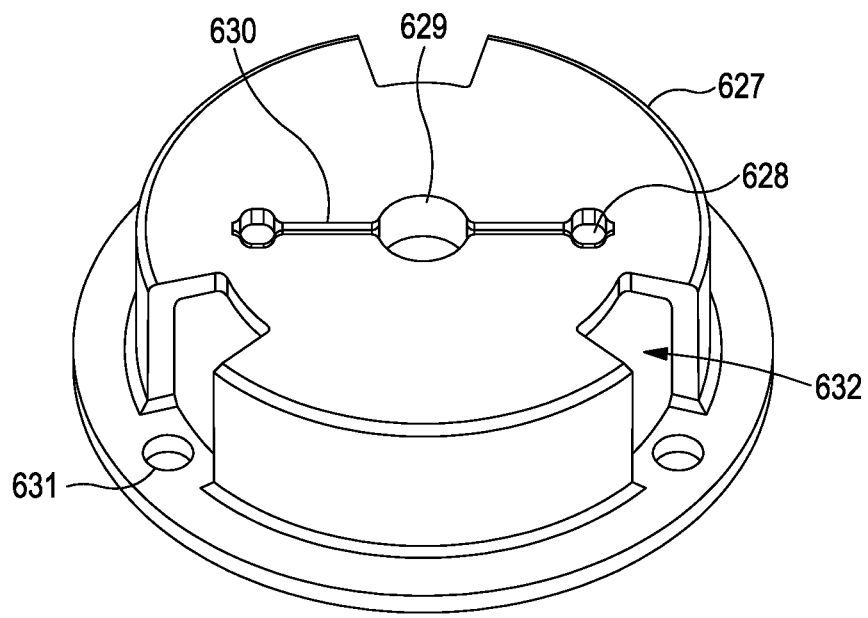
FIG. 7 shows a spring mount of an embodiment of a vibrational energy harvester in accordance with the invention.

FIG. 7 shows a spring mount 627 which may be implemented in a vibrational energy harvester such as the vibrational energy harvesters 100, 200, 400. The spring mount 627 is configured to be located over an end of a first mass 101 (or for example over a cap 313 of a first mass 301) within a housing 104 of a vibrational energy harvester 100. The spring mount 627 is configured to provide a connection point to electrically connect one or more springs 108 (not shown), which in turn are connected to conductive material of the first mass 101, to a connector 104a (not shown) configured to deliver the electrical power generated by the vibrational energy harvester to an external device. In the embodiment shown, the spring mount 627 comprises one or more apertures or hooks 628 configured to attach to or receive an end of each of the one or more springs 108. The spring mount 627 also comprises an aperture 629 configured to receive the connector 104a. In the embodiment shown, the spring mount 627 comprises one or more channels 630 configured to receive wires connecting the springs 108 (or the hooks 628 in contact with the springs 108) to the connector 104a. Alternatively, the spring mount 627 may not comprise the channels 630. In the embodiment shown, the spring mount 627 comprises a plurality of holes 631. The holes 631 are each configured to allow, for example, a screw to pass through and connect, for example, an upper portion 420a and a lower portion 420b of the housing 104 together. The spring mount 627 also comprises a recess 632 configured to receive a resilient element 106a, 106b, such that the resilient element 106a, 106b is disposed between the first mass 101 and the spring mount 627.

Figure 8:
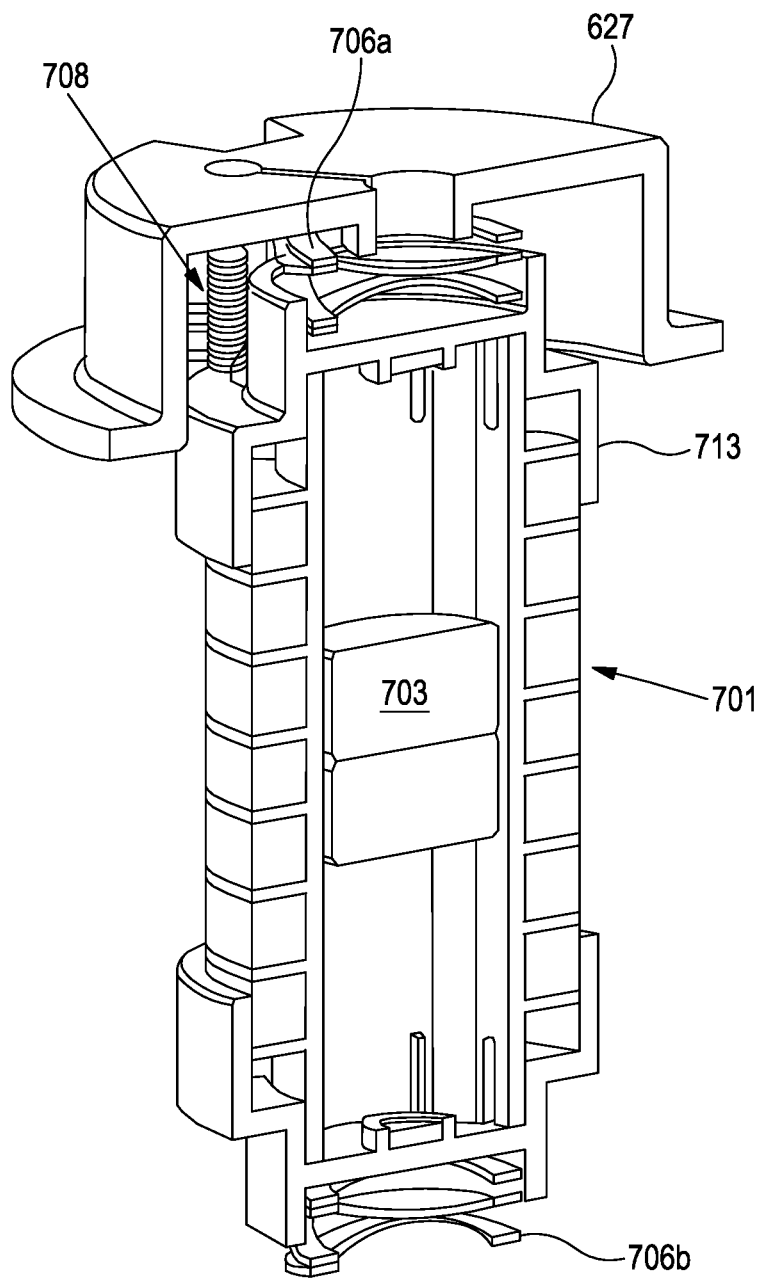
FIG. 8 show an assembly view of an embodiment of a first mass, second mass and spring mount of an embodiment of vibrational energy harvester in accordance with the invention.

Part of an assembled vibrational energy harvester 700 in which the spring mount 627 is implemented is shown in FIG. 8. A first mass 701 comprising a cap 713 defines a first closed internal cavity 702 in which a second mass 703 is disposed. A resilient member 706a, 706b is located at either end of the first mass 701. The spring mount 627 receives one of the resilient members 706a. Springs 708 are configured to form an electrical connection between the conductive material of the first mass 701 and a connector 104a (not shown) via the spring mount 627.

Figure 9A:
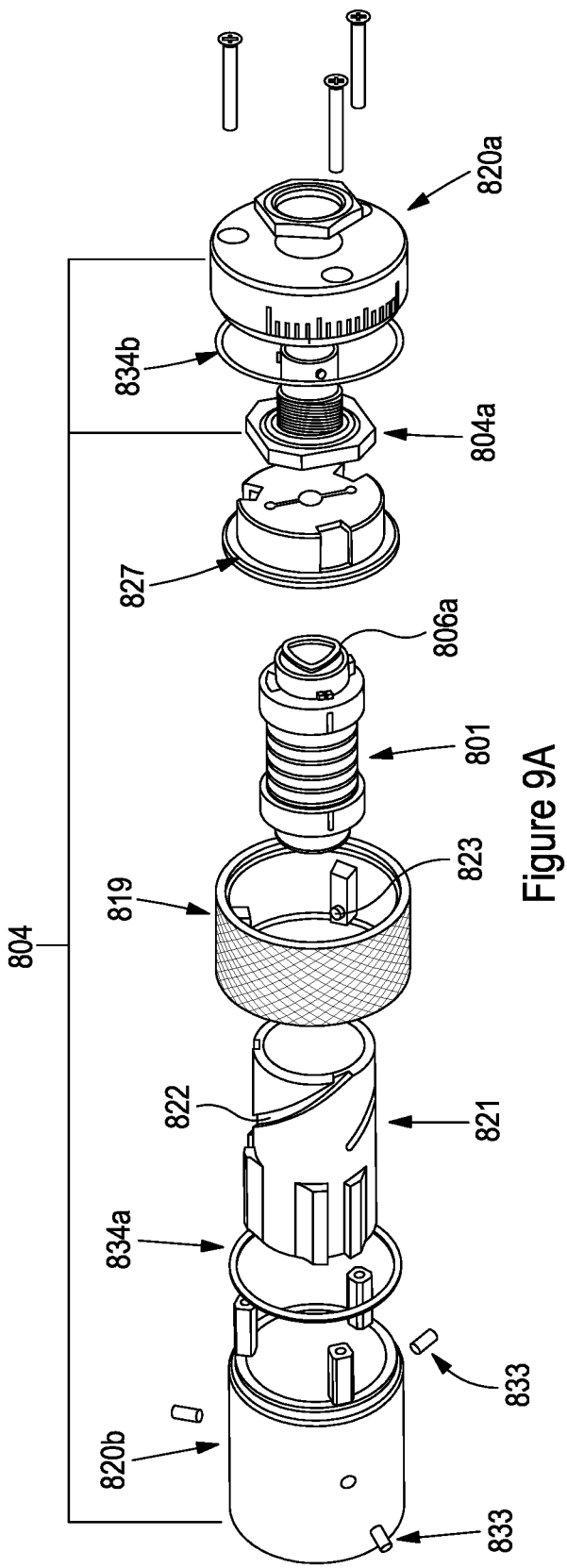
FIGS. 9A and 9B show an exploded view of an embodiment of a vibrational energy harvester in accordance with the invention.
Figure 9B:
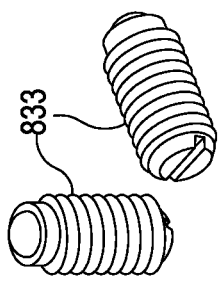

FIG. 9A shows an embodiment of a vibrational energy harvester 800 in accordance with the invention. The vibrational energy harvester 800 comprises a housing 804. The housing 804 comprises a first (e.g., upper) portion 820a, a second (e.g., lower) portion 820b, and an adjuster 819. The adjuster 819 is rotatably couplable to the upper portion 820a and the lower portion 820b of the housing 804 via respective O-ring seals 834a, 834b. A cam 821 is disposed within the housing 804. The cam 821 is coupled to the adjuster 819 (via one or more helical channels 822 on the cam and one or more corresponding protrusions 823 on the adjuster 819) such that rotation of the adjuster relative to the upper portion 820a and the lower portion 820b of the housing 804 causes axial displacement of the cam 821 within the housing 804. Spring-loaded plungers 833 (shown in more detail in FIG. 9B) are configured to interact and engage with one of a plurality of holes 426 on the cam 821. In the embodiment shown in FIG. 9B, the spring-loaded plungers 833 comprise a thread configured to engage with a corresponding thread through a thickness of the housing 804, securing the spring-loaded plungers 833 to the housing 804. Alternatively, the spring-loaded plungers 833 may slot or clip into the housing 804 using corresponding male and female components located on the spring-loaded plungers 833 and the housing 804 respectively. A first mass 801 is disposed within and configured to move within a second closed internal cavity 105 formed by the cam 821 and the housing 804. A spring mount 827 is disposed between a first end of the first mass 801 and the upper portion 820a of the housing 804. The spring mount 827 comprises a recess (e.g., similar to recess 632 as shown in FIG. 7) configured to receive a resilient element 806a. The resilient element 806a is also in contact with the first end of the first mass 801. The spring mount 827 is also configured to provide a connecting point between springs 108 (not shown), which in turn are connected to coils 309 of the first mass 801, and a connector 804a configured to deliver electrical power generated by the vibrational energy harvester 800 to an external device. In the embodiment shown, the connector 804a passes through an aperture in the upper portion 820a of the housing 804. In the embodiment shown, screws are configured to pass through apertures in the upper portion 820a of the housing 804 (and apertures in the spring mount 827) and engage with screw threads in the lower portion 820b of the housing 804 to secure the various portions of the housing together, and enclose various components of the vibrational energy harvester 800 within the housing 804.

Vibrational energy harvesters such as those described above may be utilised as an alternative power source to single use or even rechargeable batteries, in particular for uses such as powering wireless sensor nodes and small, portable electronic devices. The vibrational energy harvesters 100, 200, 400, 800 described above may provide usable electrical power, wide frequency response for applications which exhibit vibration frequencies typically associated with human motion, industrial machineries, railways and automotive, aeronautical, and agricultural applications (e.g., below 100 Hz, such as between 5 Hz and 20 Hz).

Individual features pertaining to each of the separate embodiments described above may be combined with any or all of the features described with respect to any of the other embodiments described. For example, the first mass 301 described with respect to FIG. 3 may be utilised in any of the vibrational energy harvesters 100, 200, 400, 700, 800. The housing 404 described with respect to FIGS. 4 and 5 may be implemented in any of the vibrational energy harvesters 100, 200, 400, 700, 800. The cap 513 as shown in FIG. 6 may be utilised with the first masses 101, 201, 301, 701, 801 in any of the vibrational energy harvesters 100, 200, 400, 700 800. The spring mount 627 described with regard to FIG. 7 may be implemented in any of the vibrational energy harvesters 100, 200, 400, 800.

From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination.

For the sake of completeness it is also stated that the term "comprising" does not exclude other elements or steps, the term "a" or "an" does not exclude a plurality, and any reference signs in the claims shall not be construed as limiting the scope of the claims.

The invention claimed is:
1. A vibrational energy harvester comprising:
a first mass comprising a first internal cavity;
a second mass disposed within and configured to move within the first internal cavity;
wherein movement of the second mass relative to the first mass induces an electrical current in one of the first mass and the second mass;
a housing comprising a second internal cavity;
wherein the housing comprises a plurality of portions, wherein at least one of the portions of the housing is movable relative to one or more of the other portions of the housing;

wherein the first mass is disposed within and configured to move within the second internal cavity;

a cam coupled to the at least one movable portion of the housing; and an adjustment mechanism configured to adjust a size of the second internal cavity.

2. The vibrational energy harvester of claim 1, wherein the adjustment mechanism is configured to adjust the size of the second internal cavity without adjusting an external size of the vibrational energy harvester.

3. The vibrational energy harvester of claim 1, wherein an axial position of the cam relative to the one or more other portions of the housing is adjustable in response to movement of the at least one movable portion of the housing relative to the one or more other portions of the housing.

4. The vibrational energy harvester of claim 1, wherein the cam and the at least one movable portion of the housing are coupled via corresponding male and female connectors, and wherein the cam comprises one or more grooves and the at least one movable portion of the housing comprises one or more protrusions configured to engage with the one of more grooves, and further wherein the cam comprises helical grooves.

5. The vibrational energy harvester of claim 1, wherein the second mass is configured to move along a first fixed axis within the first internal cavity.

6. The vibrational energy harvester of claim 1, further comprising one or more elements disposed at each end of the first internal cavity, wherein the elements are configured to control oscillation of the second mass in the first internal cavity, and wherein the one or more elements are or comprise one of magnetic springs and mechanical springs.

7. The vibrational energy harvester of claim 1, further comprising one or more elements disposed at each end of the second internal cavity, wherein the elements are configured to control oscillation of the first mass in the second internal cavity, and wherein the one or more elements are or comprise one of magnetic springs and mechanical springs.

8. The vibrational energy harvester of claim 1, wherein the first mass is configured to move along a second fixed axis within the second internal cavity.

9. The vibrational energy harvester of claim 7, wherein a first fixed axis and a second fixed axis are coaxial or are the same.

10. The vibrational energy harvester of claim 1, wherein the first mass has a greater mass than the second mass.

11. The vibrational energy harvester of claim 1, wherein the first mass is or comprises a conductive material.

12. The vibrational energy harvester of claim 10, wherein the first mass is or comprises a plurality of coils, and wherein the coils are wound using a single wire or using multiple wires, and further wherein the coils are wound such that adjacent coils alternate between being wound clockwise and being wound anti-clockwise.

13. The vibrational energy harvester of claim 1, wherein the second mass comprises a stack of magnets, and wherein the stack of magnets comprises one or more of a Halbach stack, a stack of oppositely axially polarised magnets and a stack of axially polarised magnets.

14. The vibrational energy harvester of claim 1, further comprising an electrical output portion electrically connected via one or more conductive springs to the one of the first mass and the second mass in which an electrical current is induced.

15. The vibrational energy harvester of claim 1, wherein an elastic constant of the one or more conductive springs is lower than an elastic constant of the one or more elements.

16. The vibrational energy harvester of claim 1, wherein:
i) a size of the second internal cavity is adjustable in increments of between substantially 0.25 mm and 1.0 mm; and/or
ii) a size of the second internal cavity is adjustable between a length of substantially 80 mm and a length of substantially 45 mm.

17. The vibrational energy harvester of claim 1, wherein a resonant frequency of the vibrational energy harvester is adjustable by substantially 40 Hz by adjusting a size of the second internal cavity.

18. The vibrational energy harvester of claim 1, wherein a resonant frequency of the vibrational energy harvester is adjustable between substantially 5 Hz and substantially 45 Hz by adjusting a size of the second internal cavity.

* * * * *